United States Patent [19]

Heinegg

[11] Patent Number: 4,773,690
[45] Date of Patent: Sep. 27, 1988

[54] CADDY FOR FOOD PROCESSOR ELEMENTS

[76] Inventor: Christian F. Heinegg, 308 Cabrillo Ave., Santa Cruz, Calif. 95065

[21] Appl. No.: 49,435

[22] Filed: May 14, 1987

[51] Int. Cl.$^4$ .................... A47B 81/00; B65D 85/00
[52] U.S. Cl. .................................. 294/146; 206/373; 211/13; 294/159
[58] Field of Search ........................ 294/137, 142–146, 294/159, 162, 163, 172; 206/349, 372–374, 553, 575, 576; 211/13, 41, 70.6, 70.7, 126; 220/20–22; 312/237, DIG. 33

[56] References Cited

U.S. PATENT DOCUMENTS

| D. 255,753 | 7/1980 | Hoffman et al. | 206/373 X |
| 3,025,998 | 3/1962 | Petersen | 294/146 X |
| 3,027,041 | 3/1962 | Stansbury et al. | 211/41 X |
| 3,618,749 | 11/1971 | Vaccaro | 294/146 X |
| 3,887,103 | 6/1975 | Spooner | 294/146 X |
| 4,146,131 | 3/1979 | Hoffman et al. | 206/373 |
| 4,334,724 | 6/1982 | Rogers | 206/373 X |
| 4,505,393 | 3/1985 | Fleigle et al. | 294/159 X |
| 4,557,389 | 12/1985 | Williams et al. | 211/13 |

FOREIGN PATENT DOCUMENTS

| 968988 | 12/1950 | France | 294/146 |
| 3024556 | 2/1982 | Fed. Rep. of Germany | 294/146 |
| 15791 | of 1906 | United Kingdom | 294/159 |

Primary Examiner—Johnny D. Cherry
Attorney, Agent, or Firm—Paul B. Fihe

[57] ABSTRACT

Disclosed herein is a caddy for the various detachable operating elements of a food processor. One section receives the blades or paddles and accomodates their mounting stems or shanks. Another section includes a plurality of narrow compartments for receiving slicing or grating discs while a further section includes vertically aligned openings for receiving elongated elements.

2 Claims, 1 Drawing Sheet

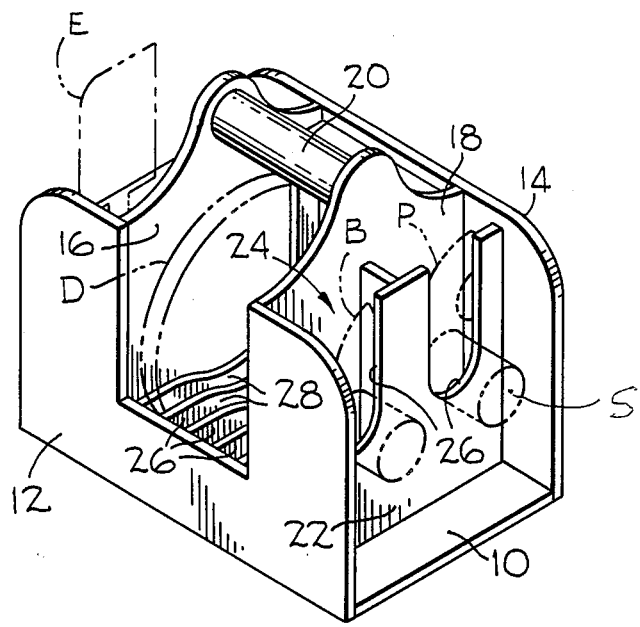
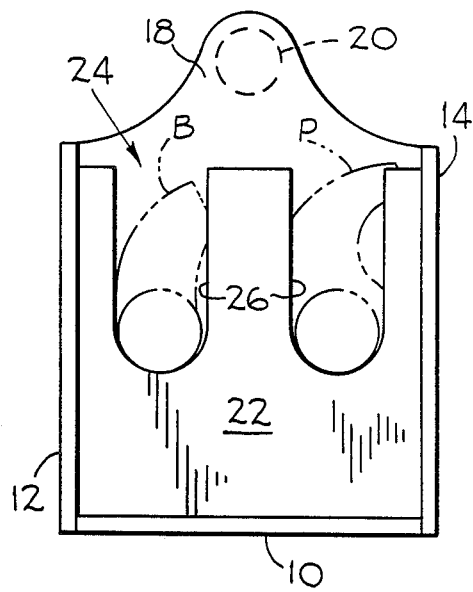
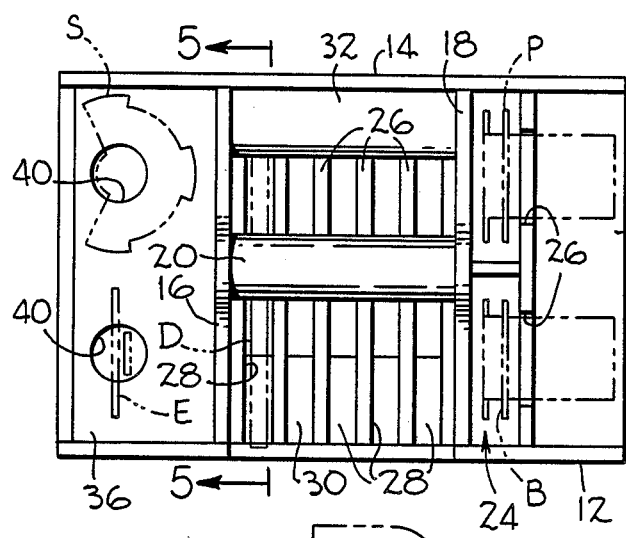
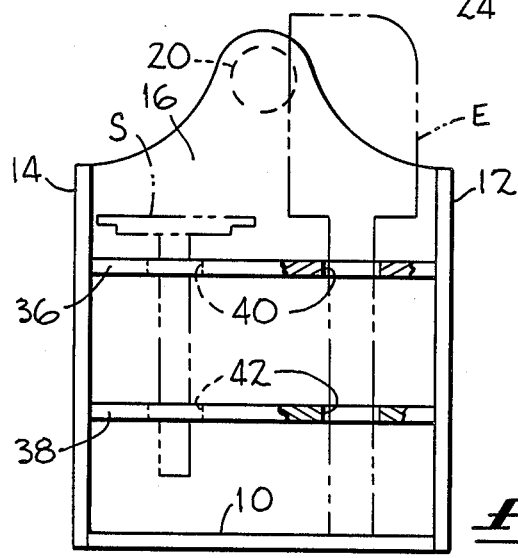
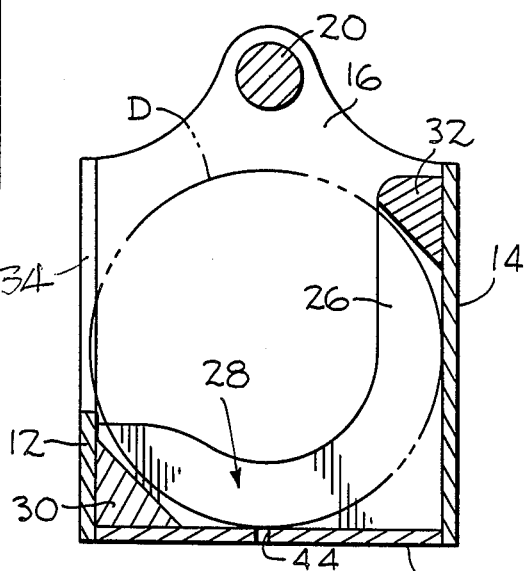

000
CADDY FOR FOOD PROCESSOR ELEMENTS

FIELD OF THE INVENTION

The present invention relates generally to tool caddies and, more particularly, to a caddy for holding the various detachable elements selectively utilized in food processors.

BACKGROUND OF THE INVENTION

For various food processing operations, a wide variety of detachable operating elements are utilized. A number of circular discs are used for slicing, grating and similar operations and are commonly connected to the driving motor by a universal drive stem. Alternatively, cutting and chopping blades or mixing paddles can also be driven from the same drive motor. Selecting the desired operating element from the large number stored, for example, in a simple box or drawer can be tedious, and more importantly can result in severe finger cuts on the sharp edges if great care is not used.

SUMMARY OF THE PRESENT INVENTION

Accordingly, it is the general objective of the present invention to provide a storage caddy for the major detachable operating elements of a food processor which automatically organizes the elements for ease of selection and, moreover, restricts access directly to any sharp cutting edges thus to preclude inadvertent injury to the user.

To achieve such objective, a relatively flat base supports side walls and bridging partitions of various configurations which divide the unit into several sections arranged to support the various common operating elements of a food processor.

More particularly, a section adjacent one end of the unit is formed to provide an upwardly-opening compartment arranged to receive cutting blades or mixing paddles. Lateral openings in the compartment side accommodate the lateral mounting stems or shanks for the blades or paddles, allowing manual access without finger contact of the sharp blades.

A central section is arranged to form a plurality of compartments separated by partial partitions to enable angular introduction of a plurality of slicing or grating discs of standard dimensions. The compartments are open at the top and one side but stops preclude direct vertical or horizontal entrance or withdrawal of the discs.

Vertically-spaced horizontal partitions with aligned openings are secured between the side walls at the other end of the unit to accommodate a mounting stem for the discs and other elongated elements.

A handle is mounted preferably above the central section between the major partitions enabling a balanced support of the entire unit.

Preferably, holes are formed in the base below the various compartments to enable drainage of excess water.

DESCRIPTION OF THE DRAWING

The stated objective of the invention and the manner in which it is achieved will be more readily understood by reference to the following detailed description of the exemplary embodiment of the invention shown in the accompanying drawing wherein:

FIG. 1 is a perspective view of a food processor caddy embodying the present invention.

FIG. 2 is a right end elevational view of the unit,

FIG. 3 is a top plan view of the unit,

FIG. 4 is a left end elevational view thereof, and

FIG. 5 is a transverse sectional view taken along line 5—5 of FIG. 4.

DETAILED DESCRIPTION OF THE ILLUSTRATED EMBODIMENT OF THE INVENTION

With reference to the drawing, the caddy for food processor elements includes a relatively flat rectangular base 10 composed of rigid sheet material such as wood, metal or plastic, adapted to rest on a flat horizontal surface.

From the side edges of such base 10, rigid side walls 12,14 extend upwardly and are joined at intermediate positions by spaced rigid partitions 16, 18 which divide the unit into three sections. The upper ends of these partitions are curved upwardly and a round rod joins the two to form a central handle 20.

Adjacent the right end of the caddy, an additional transverse partition 22 is joined to the side walls 12, 14 forming a compartment 24 which is adapted to receive cutting blades B or or mixing paddles P attached to stems or shanks s, as best shown in phantom lines in FIGS. 1, 2 and 3. Such stems are received in vertical slots 26 in the partition 22 but do not extend beyound the ends of the side walls 12, 14.

In the central section of the unit, a plurality of spaced partial partitions 26 are joined to the side walls 12, 14 to provide a plurality of disc-receiving compartments 28, each having angular openings through the top and one side thereof enabling lateral angular insertion of slicing or grading circular discs D as shown in phantom lines in FIGS. 1, 3 and 5. Stops 30, 32 at the base and side walls 12 as well as the handle 20 preclude direct vertical or horizontal entry or exit of the discs D, but a central slot 34 in the side wall 12 enables the angular entry or withdrawal of the discs D.

Adjacent the opposite end of the unit, (the third section) a pair of horizontal partitions 36, 38 are disposed between the side walls 12, 14 and have aligned openings 40, 42 as best shown in FIG. 4 for the reception of a drive stem S for the discs or other elongated elements E conventionally utilized with food processors.

Thus, the caddy can contain all common food processor ements in an organized and easily selectable fashion.

Preferably, holes 44 are formed in the base 10 below the compartments 28 to allow water drainage.

While one embodiment has been disclosed, it is obvious that various modifications and or alterations can be made without departing from the spirit of the invention and the actual scope of the invention is indicated only by the appended claims.

What is claimed is:

1. A caddy for food processor elements which comprises
   a relatively flat base,
   an inwardly-opening compartment adjacent one end of said base forming a pocket for a cutting blade or mixing paddle having a shank portion,
   said compartment having a lateral opening adapted to receive the shank portion of the cutting blade and/or paddle and
   means forming a plurality of laterally adjacent disc compartments above another portion of said base and extending entirely thereacross, each having top and side openings enabling reception of a single procesosr slicing or grating disc., a generally-horizontal handle connected to said disc compartment forming means, and substantially centrally-located over said disc compartments, each of said disc compartments having stops extending partially into said top and side openings to restrict direct upward or lateral withdrawal of the discs.

2. A caddy according to claim 1 which comprises substantially horizontal partitions connected to said disc compartment forming means above said base and having vertically aligned openings for receiving elongated elements.

* * * * *